United States Patent [19]

Amada et al.

[11] Patent Number: 4,796,296
[45] Date of Patent: Jan. 3, 1989

[54] PCM CODER AND DECODER HAVING FUNCTION OF TWO-WIRE/FOUR-WIRE CONVERSION

[75] Inventors: Eiichi Amada, Kodaira; Kazuo Yamakido, Nishitama; Takahiko Kozaki, Kokubunji; Shigeo Nishita, Kokubunji; Masaru Kokubo, Kokubunji, all of Japan

[73] Assignee: Hitachi, Ltd., Tokyo, Japan

[21] Appl. No.: 739,295

[22] Filed: May 30, 1985

[30] Foreign Application Priority Data

May 30, 1984 [JP] Japan ................... 59-108354
Jun. 27, 1984 [JP] Japan ................... 59-131048

[51] Int. Cl.[4] ............................. H04B 3/23
[52] U.S. Cl. ................... 379/410; 379/345; 370/32.1
[58] Field of Search ........... 379/399, 405, 410, 407, 379/411, 406, 402, 400, 398; 370/32.1, 32

[56] References Cited

U.S. PATENT DOCUMENTS

| | | | |
|---|---|---|---|
| 3,855,430 | 12/1974 | Colardelle et al. | 379/405 |
| 4,270,027 | 5/1981 | Agrawal et al. | 379/399 X |
| 4,284,859 | 8/1981 | Araseki | 379/405 |
| 4,292,479 | 10/1981 | Chataignon et al. | 379/405 |
| 4,301,336 | 11/1981 | Müting | 379/405 |
| 4,357,495 | 11/1982 | Sweet et al. | 379/405 X |
| 4,467,146 | 8/1984 | Lassaux | 379/407 X |
| 4,472,608 | 10/1984 | Beirne | 379/399 |
| 4,527,020 | 7/1985 | Ito | 379/410 |
| 4,558,185 | 12/1985 | Morikawa | 379/402 |
| 4,608,464 | 8/1986 | Morikawa | 370/32.1 |
| 4,628,157 | 12/1986 | Chance et al. | 379/410 |
| 4,670,903 | 6/1987 | Araseki et al. | 379/411 |

OTHER PUBLICATIONS

"Signal Processing Chips Enrich Telephone Line–Cord Architecture", Apfel et al., Electronics, May 5, 1982, pp. 113–118.
"Voice–Frequency Transmission Treatment for Special-Service Telephone Circuits", Blake et al., Bell System Technical Journal, vol. 60, No. 7, Sep. 1981, pp. 1585–1619.
"A Blockless Echo Suppressor", A. Miura et al., IEEE Transactions on Communication Technology, vol. COM-17, No. 4, Aug. 1969, pp. 489–495.

Primary Examiner—Jin F. Ng
Assistant Examiner—Randall S. Vaas
Attorney, Agent, or Firm—Antonelli, Terry & Wands

[57] ABSTRACT

A CODEC including a coder and decoder to construct the subscriber's circuit of a digital telephone switching system or the like, wherein an analogue balancing circuit is provided between the output terminal of a post-filter and the input terminal of a pre-filter in order to effectively eliminate a return signal in the case of two-wire/four-wire conversion, and return signals not eliminated by the analogue balancing circuit are further eliminated by a digital balancing circuit.

Especially in the present invention, the analogue balancing circuit is so constructed that its characteristics are independent of frequencies, and hence, the analogue balancing circuit and the digital balancing circuit are readily implemented as an LSI.

5 Claims, 4 Drawing Sheets

PCM CODER AND DECODER HAVING FUNCTION OF TWO-WIRE/FOUR-WIRE CONVERSION

BACKGROUND OF THE INVENTION (1) Field of the Invention

The present invention relates to a PCM coder and decoder having the function of two-wire/four-wire conversion, and more particularly to a coder and decoder (CODEC) which is used in the subscriber's circuit of a digital switching system, etc. and in which a PCM signal applied to a four-wire receiving line is decoded and converted into an analogue signal that is sent to a two-wire subscriber's line, while an analogue signal from the two-wire subscriber's line is encoded into a PCM signal that is sent to a four-wire transmission line.

(2) Description of the Prior Art

The subscriber's circuit of a switching system is arranged so as to have the functions of battery feed, overvoltage protection, ringing, supervision, PCM encoding and decoding, two-wire/four-wire conversion, test, etc.

In the arrangement having these functions, a circuit for the two-wire/four-wire conversion has heretofore been constructed separately from a PCM coder and decoder. Recently, however, with progresses in semiconductor integration technology and signal processing technique, it is studied to construct the conversion circuit unitarily with the PCM coder and decoder (Electronics/May 5, 1982, pp. 113-118). In order to realize the function of two-wire/four-wire conversion by the use of an electronic circuit, an input signal from a four-wire receiving line must be sent to only a bidirectional two-wire line, such as subscriber's line, so as not to return to a four-wire transmission line and then be provided as an output. To this end, in a PCM coder and decoder hitherto proposed, a circuit for cancelling a return signal, namely, a balancing circuit is constructed of a digital circuit unitarily with the PCM coder and decoder. More specifically, a voice analogue signal from a two-wire line to be transmitted is converted into a digital signal via a pre-filter for eliminating high frequency noise and an A/D converter, and the digital signal has its band limited by a digital filter and is thereafter delivered to a four-wire transmission line as a PCM signal. On the other hand, a PCM signal received from a four-wire receiving line has its band limited by a digital filter and is passed through a D/A converter and a post-filter so as to be supplied to a two-wire line as a voice analogue signal. The balancing circuit is so constructed that a filter which has characteristics approximating the transmission characteristics of the path of the return signal is interposed between the A/D converter and the D/A converter so as to subtract the output of the filter from the output of the A/D converter.

With the PCM coder and decoder as stated above, an amplifier circuit is generally provided in the path of the return signal. It is therefore sometimes the case that the return signal becomes greater in amplitude than the received signal and exceeds the coding level of the A/D converter. Even when the return signal is not higher than the maximum coding level, the return signal is superposed on the signal from the two-wire line which ought to be transmitted, resulting in the problem that the dynamic range of the transmission signal becomes insufficient to deteriorate the S/N ratio.

Further, when it is intended to implement the coder and decoder in the form of an LSI, the composite amplitude of the return signal and the transmission signal might exceed a supply voltage to destroy the LSI.

In contrast to the aforementioned balancing circuit realized by the all-digital circuit, it is also considered that a balancing circuit is constructed of only analogue circuits and is formed between the input of an A/D converter and the output of a D/A converter. Since, however, the balancing circuit needs to be suited to various loads, namely, impedances on the two-wire line side, it must comprise a plurality of analogue circuits having different transfer functions, and a circuit for selecting and controlling the optimum analog circuit is required. In case of digital circuitry, a plurality of balancing circuits can be readily realized by changing the coefficient of a multiplier unit and without adding any circuit device, whereas in case of analogue circuitry, the realization of a plurality of balancing circuits of different transfer functions makes it necessary to switch and use different resistors, capacitors, operational amplifiers etc., resulting in a large circuit device scale which incurs the problem that an economical occupation area cannot be held in the LSI implementation.

Further, a circuit arrangement comprising an analogue balancing circuit and a digital balancing circuit has been proposed (for example, "The Bell System Technical Journal", Vol. 60, No. 7, pp. 1585-1619, September 1981).

The analogue balancing circuit proposed, however, needs to especially employ a transfer function having a biased frequency characteristic with one pole and no zero so that the impedance of a two-wire/four-wire interface portion (for example, a transformer) can be coped with besides a plurality of two-wire subscriber's line impedances. Accordingly, the realization of such an analogue balancing circuit requires a capacitor or an inductor of comparatively large element value, and the LSI implementation is, in effect, impossible from the economical viewpoint as in the foregoing case. Moreover, with the analogue balancing circuit, a fluctuation in the absolute value of the element value directly changes the frequency—gain characteristic and phase characteristic of a return signal, and it becomes very difficult to suppress the return signal precisely by means of the digital balancing circuit at the suceeding stage.

SUMMARY OF THE INVENTION

It is accordingly an object of the present invention to realize a PCM coder and decoder having a balancing circuit which suppresses the level of a return signal and whose circuit arrangement is simple enough to facilitate LSI implementation.

Another object of the present invention is to realize by the use of digital signal processing technology a digital CODEC having a two-wire/four-wire conversion function which exhibits a sufficient return loss.

The present invention for accomplishing the first-mentioned object consists in a PCM coder and decoder (PCM CODEC) having a two-wire/four-wire conversion function, characterized in that the balancing circuit is divided into two portions, the first portion of which is constructed of a digital circuit interposed between the input side of a D/A converter and the output side of an A/D converter and the second portion of which is constructed of an analogue circuit interposed between the output side of the D/A converter and the input side of the A/D converter and having no frequency response, namely, having a gain independent of frequencies.

According to the present invention, the portion constructed of the analogue circuit is used for stably lowering the level of the return signal, whereby degradation in the S/N ratio of the A/D converter is lessened, and the portion constructed of the digital circuit is used for changing the transfer function of a digital filter in accordance with the impedance of a two-wire transmission line side, whereby the return signal can be canceled at high precision.

In a more preferable aspect of performance of the present invention, a circuit portion whose sampling frequency is high, that is, whose sampling period is short is used for adjusting a signal delay, whereby a delay compensation of high precision is permitted, and a sufficient return loss is attained.

The above-mentioned and other objects and features of the present invention will become more apparent from the following description taken in conjunction with the accompanying drawings.

DETAILED DESCRIPTION OF THE EMBODIMENTS

Figure 1:
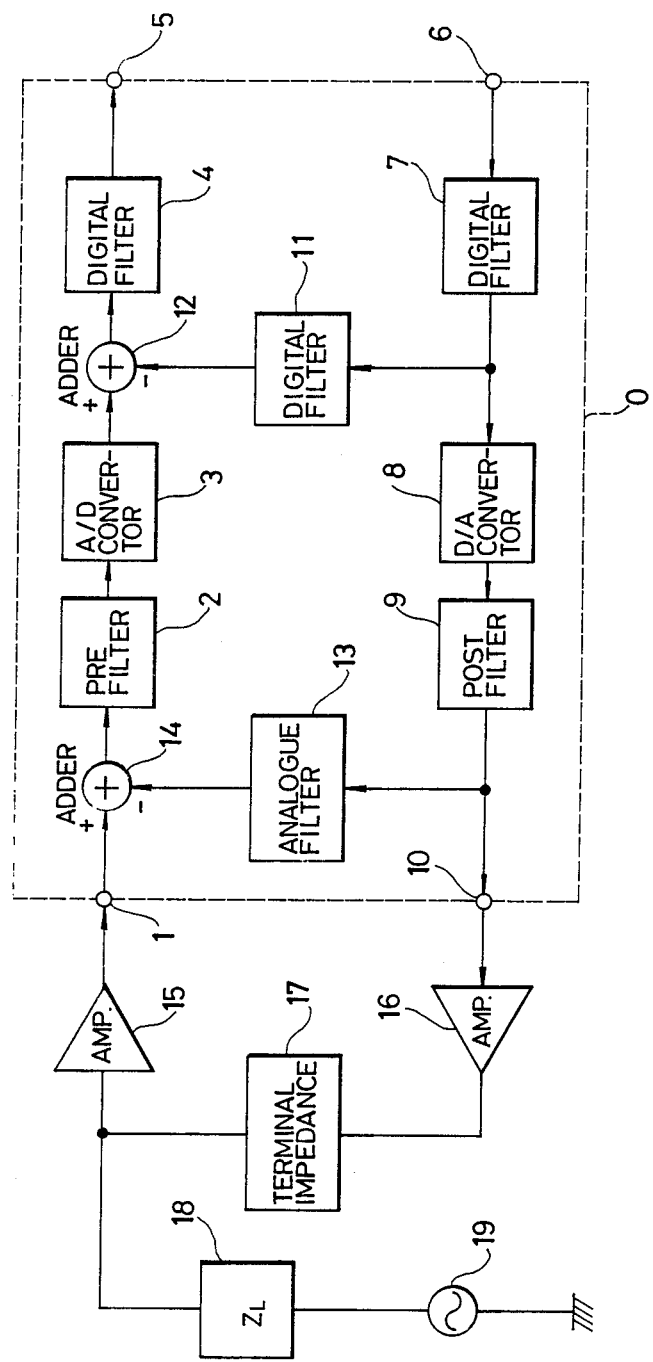
FIG. 1 is a diagram showing the arrangement of an embodiment of a PCM CODEC according to the present invention.

FIG. 1 is a diagram showing the arrangement of one embodiment of a PCM coder and decoder (CODEC) according to the present invention. In the figure, a portion enclosed with a dotted line 0 is a coding and decoding portion which has a balancing circuit, while the other portion is an equivalent circuit from the analogue input and output terminals 1, 10 of this coder and decoder to a telephone set and is conjointly illustrated for the description of the present invention. A PCM signal from a receiving line (not shown) which is a four-wire line is applied through a terminal 6 and has its band limited by a digital filter 7. Part of the resulting signal is converted by a D/A converter 8 into an analogue signal, which is smoothed by a post-filter 9 and then provided from the terminal 10 as a decoded voice analogue signal. On the other hand, a voice analogue signal to be transmitted is applied through the input terminal 1, an adder 14 and a pre-filter 2 for eliminating high frequency noise to an A/D converter 3, by which it is converted into a digital signal. Further, the digital signal is passed via an adder 12 and has its band limited by a digital filter 4, whereupon the resulting signal is delivered from an output terminal 5 to a transmission line (not shown) of a four-wire line as a PCM signal.

As will be discussed in detail later, a digital filter 11 and an analogue filter 13 constitute the balancing circuit along with the adder 12 and the adder 14 respectively. This balancing circuit is a circuit for eliminating a signal, which arises in such a manner that the analogue signal from the terminal 10 returns through an amplifier 16, a terminal impedance 17 and an amplifier 15, and it forms the essential portion of the present invention.

After passing through the external amplifier 16 (gain b), the reception side voice analogue signal at the terminal 10 has its voltage divided by the terminal circuit (impedance $Z_T$) 17, and the resulting signal is supplied to a two-wire side telephone line (impedance $Z_L$) 18. On the other hand, the transmission side voice analogue signal is passed from a signal source 19 through the impedance 18 and is divided by the terminal impedance 17, and the resulting signal is supplied to the input terminal 1 of the coder and decoder through the external amplifier 15 (gain a). At this time, part of the reception side analogue signal returns to the transmission side. Therefore, letting $v_s$ and $v_r$ denote the signal voltages of the signal source 19 and the terminal 10 respectively, a voltage $v_1$ at the terminal 1 becomes a value expressed by the following equation:

$$v_1 = \frac{a Z_T}{Z_T + Z_L} v_s + \frac{a b Z_L}{Z_T + Z_L} v_r \tag{1}$$

In the above equation, the component of the return signal is the second term. Here, by way of example, the following four typical impedances corresponding to a two-wire side telephone line in North America will be concretely studied:

$$Z_{L0} = 900 + \frac{1}{2.16 \times 10^{-6} s} \; (\Omega) \tag{2}$$

$$Z_{L1} = 900 \; (\Omega) \tag{3}$$

$$Z_{L2} = \frac{800 (1 + 5 \times 10^{-6} s)}{1 + 45 \times 10^{-6} s} \; (\Omega) \tag{4}$$

$$Z_{L3} = \frac{1650 (1 + 0.5 \times 10^{-6} s)}{1 + 8.75 \times 10^{-6} s} \; (\Omega) \tag{5}$$

s in the above equation is a symbol indicative of a complex angular frequency. The terminal impedance $Z_T$ is selected to be equal to $Z_{L0}$, and the transfer function $H_{BN0}$ of the first balancing circuit 13 is assumed to be $H_{BN0}=k$ (real number). In this case, the transfer functions of the respective return signals at the terminal 1 for $Z_L=Z_{Li}$ (i=0, 1, 2, 3) become:

$$H_{0i} = \frac{a b Z_{Li}}{Z_{L0} + Z_{Li}} \tag{6}$$

and the transfer functions $H_{1i}$ of the return signals at the output of the adder 14 become:

$$H_{1i} = H_{0i} - H_{BN0} = \frac{(a b - k) Z_{Li} - k Z_{L0}}{Z_{L0} + Z_{Li}} \tag{7}$$

Figure 2:
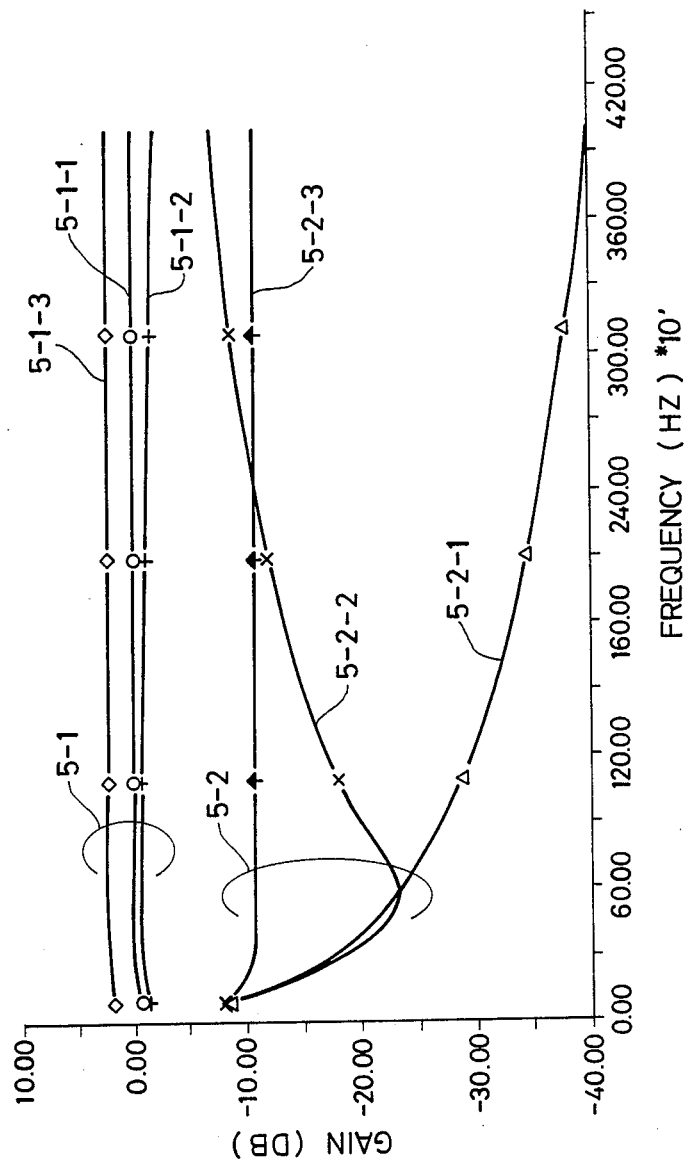
FIG. 2 shows a frequency characteristic diagram of the transfer functions of return signals.

Accordingly, if $$k = \frac{a b Z_{Li}}{Z_{L0} + Z_{Li}}$$

can be put, $H_{1i}=0$ can be established, and the return signals behind the output of the adder 14 can be completely canceled. Among the factors, the values of the gains a and b are uniquely determined by the level conditions of the switching system, but $Z_{Li}$ has various frequency characteristics as in Eqs. (2)–(5) mentioned before, so that the perfect cancellation is impossible. However, assuming k=1 for ab=2 by way of example, at least the return signal of $Z_{Li}=Z_{LO}$ can be perfectly canceled, and besides, the return signal levels can be effectively attenuated for the other impedances. FIG. 2 shows the comparison results of characteristics 5-1-i for $H_{Oi}$ and characteristics 5-2-i for $H_{li}$ (where i=1, 2, 3) as evaluated under the aforementioned condition. For all $Z_{Li}$ (i=1, 2, 3), there is the effect of the return signal suppression of at least 6 dB at the worst point of 3.4 kHz, and the dynamic range of the transmission signal can be expanded to that extent, so the S/N ratio can be improved.

Figure 3:
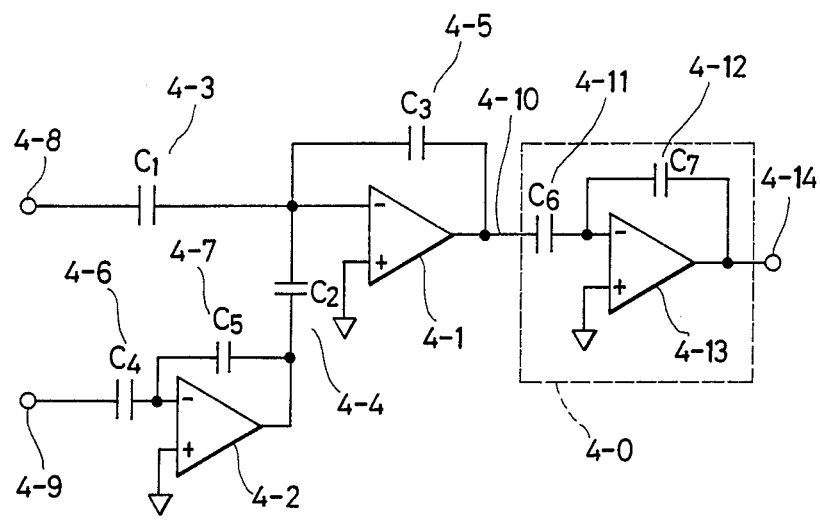
FIGS. 3 and 4 are circuit diagrams each showing an embodiment of an analogue balancing circuit in FIG. 1.

FIG. 3 shows a circuit illustrative of one embodiment of the balancing circuit 13 and adder 14 in FIG. 1 in the case of ab>0. A terminal 4-8 is connected to the input terminal 1, a terminal 4-9 is connected to the output side of the post-filter, and a terminal 4-14 is connected to the input side of the pre-filter. A capacitor 4-6 (capacitance $C_4$), a capacitor 4-7 (capacitance $C_5$) and an operational amplifier 4-2 constitute a well-known amplifier (gain=$C_4/C_5$). Likewise, a capacitor 4-3 (capacitance $C_1$), a capacitor 4-4 (capacitance $C_2$), a capacitor 4-5 (capacitance $C_3$) and an operational amplifier 4-1 constitute a circuit for the addition between the input voltage of the terminal 4-8 and the output voltage of the amplifier 4-2. Further, a capacitor 4-11 (capacitance $C_6$), a capacitor 4-12 (capacitance $C_7$) and an operational amplifier 4-13 constitute an inverting amplifier 4-0 (gain=$C_6/C_7$) for the output voltage of the amplifier 4-1. Letting $v_8$ and $v_9$ denote the input voltages of the terminals 4-8 and 4-9 respectively, the output $v_{14}$ of the inverting amplifier 4-0 becomes:

$$v_{14} = -\frac{C_6}{C_7}\left(-\frac{C_1}{C_3}v_8 + \frac{C_2}{C_3}\cdot\frac{C_4}{C_5}v_9\right) \quad (8)$$

$$= \frac{C_6 C_1}{C_7 C_3}\left(v_8 - \frac{C_2 C_4}{C_1 C_5}v_9\right)$$

Here, assuming $C_1=C_2=C_3$ and $C_6=C_7$, $$\frac{v_{14}}{v_9} = \frac{v_8}{v_9} - \frac{C_4}{C_5} \quad (9)$$

Thus, since $v_8/v_9=H_{Oi}$ and $v_{14}/v_9=H_{li}$ hold, Eq. (9) is brought into agreement with Eq. (7) by putting $H_{BNO}=k=C_4/C_5$. It is accordingly understood that the circuit of FIG. 3 realizes the desired balancing circuit 13 and adder 14 in FIG. 1. Further, the circuit of FIG. 3 can be adapted to various values of the gain ab of the external circuit by changing the ratio of $C_4$ and $C_5$.

More specifically, for ab=2, $C_4=C_5$ is set, whereby k=1 can be realized, and for, e.g., ab=1.5 and ab=3, $C_4=\frac{3}{4}C_5$ (k=$\frac{3}{4}$) and $C_4=(3/2)C_5$ (k=3/2) are respectively set, whereby effects quite equal to those illustrated in FIG. 2 can be attained for the impedances of Eqs. (2)–(5).

Figure 4:
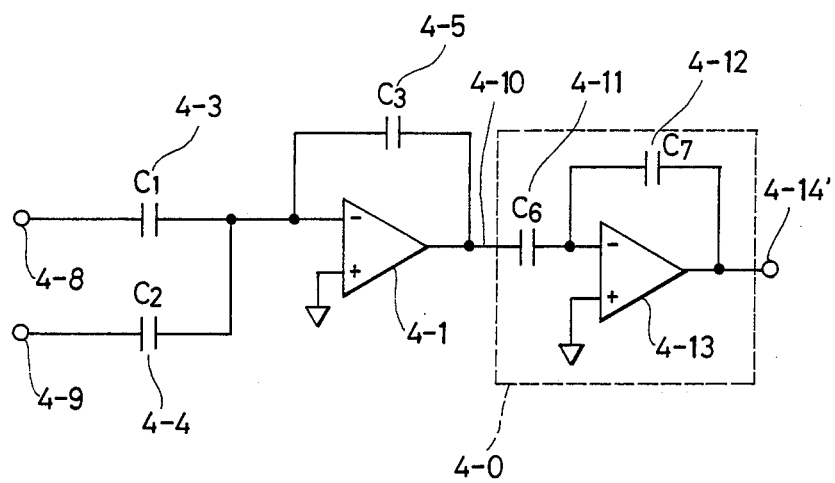

Next, FIG. 4 shows one embodiment of the balancing circuit 13 and adder 14 in FIG. 1 in the case of ab<0. Since, in this case, the phase of the return signal at the terminal 4-8 has been inverted, the signal for cancellation to be applied from the terminal 4-9 need not be phase-inverted. It is accordingly possible to omit the capacitors 4-6 and 4-7 and the amplifier 4-2 and to apply the output signal of the post-filter directly from the capacitor 4-4. The operation of this embodiment can be readily conjectured from the above first embodiment, and shall not be explained.

In FIG. 3 or FIG. 4, the inverting amplifier 4-0 indicated by a broken line can be dispensed with in such a way that the output voltage 4-10 of the amplifier 4-1 is used as an input signal to the pre-filter. As a result, the phase of the adder output signal responsive to the input signal from the terminal 4-8 is inverted. Regarding any influence ascribable thereto, if necessary, the phase inversion of the signal may be performed in any desired place of the pre-filter, the A/D converter, the digital filter, etc., and the phase inversion is possible by the use of a method already known extensively and generally.

Further, with an arrangement (not shown) wherein any of the capacitors $C_4$, $C_5$ and $C_2$ in FIG. 3 or FIG. 4 is divided into a plurality of capacitors which are respectively provided with switches, the capacitance ratios (namely, the values of k) can be switched in fixed or automatic selection fashion in correspondence with the gain (ab) of the external circuit or the impedance $Z_{Li}$ of the two-wire line.

Next, an allowable voltage will be studied. In the case of FIG. 3 or FIG. 4, the potential of the inverting input terminal of the operational amplifier 4-1 is fixed to the potential of the non-inverting input terminal (earth), and hence, the allowable voltage of the signal to be applied to the input terminal 4-8 (1 in FIG. 1) is determined by the breakdown voltage of the capacitor 4-3. In case of realizing the coder and decoder in the form of an LSI, the allowable voltage is not affected by a supply voltage or the breakdown voltage of any other circuit element (for example, the operational amplifier 4-1). In the circuits of FIGS. 3 and 4, the capacitors may well be replaced with resistance elements.

Since the analogue circuit in FIG. 3 or FIG. 4 is constructed by resorting to only the relative precisions of the capacitors or resistors, the desired value k can be exactly actualized with a comparatively small area within the LSI. However, only the exact actualization of k, per se, is not the object of the present invention. The value k referred to above is a value corresponding to one of the impedances $Z_{Li}$ (i=0, 1, 2, 3), and the return signal suppression for the other three impedances $Z_{Li}$ is still unsatisfactory as apparent from FIG. 2. Since, however, the return signal can be stably attenuated by the use of the circuit of the present invention though insufficiently, the remaining return signals can be eliminated by the balancing circuit which is composed of the digital filter 11 and the adder 12. More specifically, the transfer functions of Eq. (7) are prepared by the digital filter 11 and are subtracted by the adder 12, whereby the remaining return components can be eliminated. Since the arrangement of the digital filter has hitherto been well known, the detailed explanation shall be omitted. The digital filter can approximate Eq. (7) with transfer functions of the second order, third order or so, and it can be adapted to the change of the line impedance $Z_L$ of the two-wire side line by changing coefficients within the filter responsively and can eliminate the return components at high precision.

Figure 5:
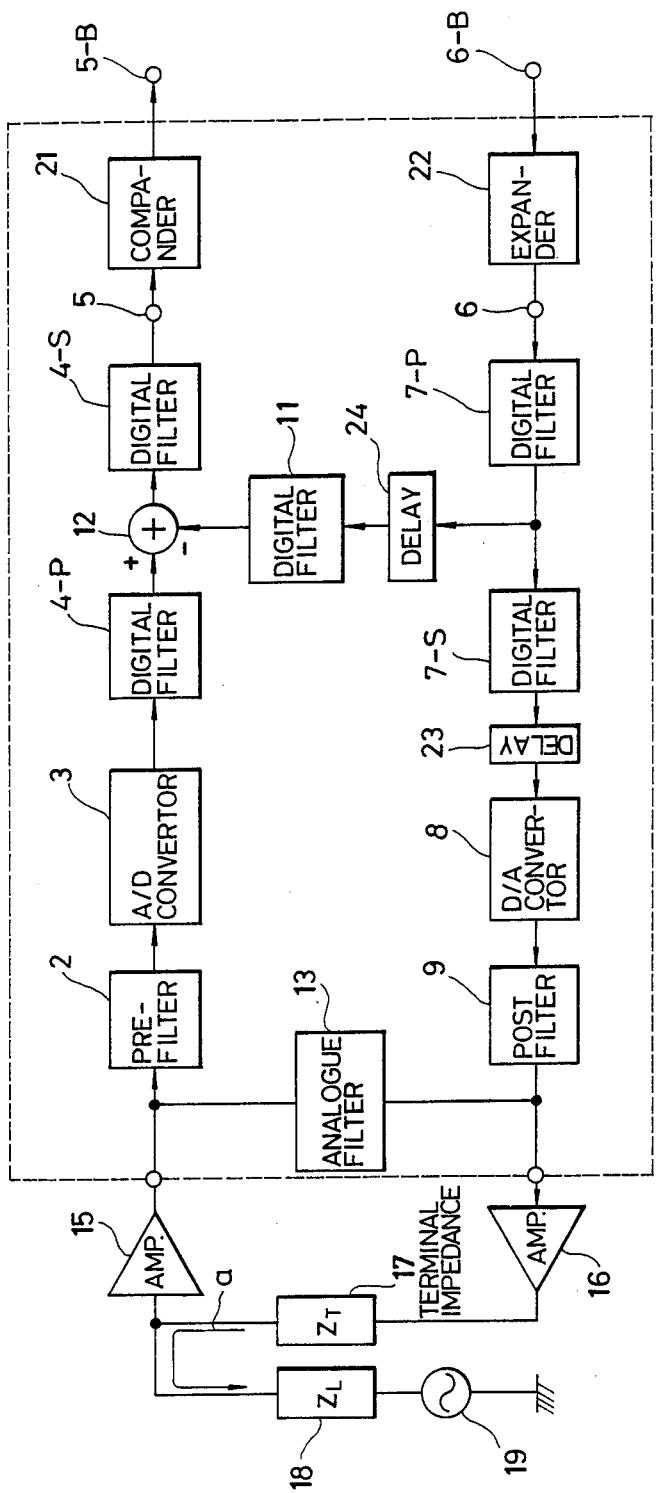
FIG. 5 shows the arrangement of another embodiment of the CODEC according to the present invention.

FIG. 5 is a diagram which shows the arrangement of another embodiment of the PCM coder and decoder according to the present invention. In the figure, the same constituents as in FIG. 1 are indicated by identical symbols.

Especially to the end of setting a sufficient return loss, the present embodiment is so arranged that delays which arise when return signals pass through digital filters 4-P and 7-S, and A/D converter 3, a D/A converter 8, analogue filters 2 and 9, etc. are precisely compensated by the output of a digital filter 11.

A PCM signal (a PCM signal according to the μ-law) from a four-wire receiving line 6-B is converted by an expandor 22 into a linear PCM signal, which is converted by a digital filter 7-P into a digital signal having a sampling frequency of 32 kHz. Part of the digital signal is further changed by the digital filter 7-S into a digital signal having a sampling frequency of 512 kHz, and the resulting signal is passed through delay means 23. The delayed signal is passed through the over-sampling type D/A converter 8 and the post-filter 9 to become a decoded analogue signal, which is partly delivered to a two-wire line being subscriber's line via a buffer amplifier 16 and a terminal impedance 17.

On the other hand, an analogue signal 19 from the subscriber's line is passed through an amplifier 15 and the pre-filter 2 and is converted by the over-sampling type A/D converter 3 into a digital signal sampled at a sampling frequency of 512 kHz. The digital signal is further changed into a digital signal at a sampling frequency of 32 kHz by the digital filter 4-P, and the resulting signal is applied to an adder 12. The adder 12 serves to eliminate a component which is such that the digital signal from the four-wire receiving line 6-B has been decoded and returned to the path of the blocks 2, 3 and 4-P through the amplifier 16 as well as the terminal impedance 17. Part of the output of the digital filter 7-P is applied to the adder 12 through delay means 24 as well as the BN (balancing network) filter 11. The output of the adder 12 applies only the signal component from the signal source 19 to a digital filter 4-S, which converts the applied signal into a linear PCM signal (at a sampling frequency of 8 kHz). Further, the linear PCM signal is changed into a nonlinear PCM signal of, for example, the μ-law or the A-law by a compressor 21, and the nonlinear PCM signal is delivered to a four-wire transmission line 5-B.

As stated before, the component by which the decoded signal returns to the coder side and which is the return signal undergoes the following delay in the course of shifting from the filter 7-S to the adder 12:

$$T_d = t_1 + t_4 + t_{ad} + t_{da} + t_2 + t_9$$

Here, $t_1$, $t_4$, $t_{ad}$, $t_{da}$, $t_2$ and $t_9$ denote the delay times of the filters 4-P, 7-S, the A/D converter 3, the D/A converter 8, the pre-filter 2 and the post filter 9, respectively. In order to eliminate the component, accordingly, the same signal as the component is prepared by the BN filter 11 and the delay means 24.

Usually, a sampling frequency of at least 512 kHz is employed for the over-sampling type A/D converter 3 and D/A converter 8, and a clock at a still higher frequency (for example, 1024 kHz) is employed for the digital filter 4-P for processing the A/D conversion result. Accordingly, when this clock is used, the delay adjustments in the delay circuits 23 and 24 can be performed at a precision corresponding to one clock pulse period of 1 μs or less.

As a result, the delays of the filters 4-P and 7-S, the A/D and D/A converters 3 and 8, the pre- and post-filters 2 and 9, etc. are considered, and the delay magnitude of the delay circuit 23 is adjusted so that the sum between the total of the considered delay magnitudes and the delay magnitude of the delay circuit 23 may become close to a value which is integral times the sampling period of the filter 7-P. Then, the delay of a signal (the output of the filter 11) for canceling the return signal can be adjusted by the simple delay circuit 24. Assuming by way of example that the sampling frequency of the output of the filter 7-P be 32 kHz, that the sampling frequencies of the A/D and D/A converters be 512 kHz, that the clock be 4.096 MHz, and that the summation of the delay times of the filters 4-P and 7-S, the A/D converter 3, the D/A converter 8, and the pre- and post-filters 2 and 9 be 119.5 μs, then the delay circuit 23 can be controlled with the clock of 4.096 MHz, and the delay magnitude thereof can therefore be set at 5.62 μs ($23 \times 1/4.096 \times 10^6$). Accordingly, the total delay magnitude can be set at 125.1 μs by the insertion of the delay circuit 23. This value is a value which is close to four times ($1/32 \times 10^3 \times 4 = 125$ μs) the sampling period of the output signal of the filter 7-P, and the delay circuit 24 can afford a delay which is integral times as large as 31.25 μs ($= 1/32$ kHz), so that the output of the filter 11 can have its delay compensated at a precision of 0.1 μs.

It is to be understood that the delay circuit in FIG. 5 can be readily constructed by the use of a shift register, a memory or the like. While, in the embodiment, the delay circuit 23 is inserted on the input side of the D/A converter, it may well be installed on the input side of the filter 7-S, the outpt side of the A/D converter or the output side of the filter 4-P, or it may well be installed in dispersed fashion.

Further, it is needless to say that a quite equal effect is attained even when the roles of the delay circuits 23 and 24 are replaced with each other so as to finely adjust the delay magnitude by means of the delay circuit 24.

As set forth above, according to the present invention, the compensation of a signal delay is permitted at high precision, and a two-wire/four-wire conversion function of good characteristics can be constructed and realized within a digital CODEC LSI, so that the miniaturization and economization of the subscriber's circuit of a switching system becomes possible over the function in the prior art constructed by adding a transformer or an external circuit.

We claim:
1. A PCM coder and decoder comprising;
a first circuit which decodes a first PCM signal and produces as an output a first analogue signal;
a second circuit which codes a second analogue signal and produces as an output a second PCM signal; and
balancing means connected to said first circuit and said second circuit for eliminating a signal produced when the output of said first circuit is applied to said second circuit;
said balancing means including an analogue balancing circuit having means for subtracting the first analogue signal of said first circuit from the second analogue signal supplied to said second circuit;
a digital balancing circuit having means for substracting said first PCM signal supplied to said first circuit from said second PCM signal of said second circuit;
said first circuit comprises a first digital filter which converts the first PCM signal into a PCM signal having a sampling frequency higher than that of said first PCM signal, a second digital filter which converts the output of said first digital filter into a

PCM signal having a sampling frequency higher than that of the output of said first digital filter, a D/A converter which converts the output of said second digital filter into an analogue output signal, and a post-filter for filtering the analogue output signal;

said second circuit comprises an analogue pre-filter, an A/D converter for converting an output signal of said pre-filter into a PCM signal, a third digital filter which changes an output of said A/D converter into a digital signal having a sampling frequency lower than that of the output of said A/D converter, and a fourth digital filter which changes an output of said digital balancing circuit into a digital signal having a sampling frequency lower than that of the output of said third digital filter; and said digital balancing circuit is connected between the output of said first digital filter and the output of said third digital filter, and said analogue balancing circuit is connected between an output terminal of said post-filter and an input terminal of said analogue pre-fitter.

2. A PCM coder and decoder according to claim 1, wherein a sampling frequency $f_1$ of the output of said third digital filter and a sampling frequency $f_2$ of the output of said first digital filter are at an integral ratio, and wherein a sum $T_d$ of delay times of a signal by said second digital filter, said D/A converter, said post-filter, said pre-filter, said A/D converter and said third digital filter is set so as to become equal to $n/\max(f_1, f_2)$ where $\max(f_1, f_2)$ denotes a maximum number of $f_1$ and $f_2$, and n is an integer.

3. A PCM coder and decoder according to claim 2, further comprising:
first digital delay means interposed between the output terminal of said first digital filter and the input of said digital balancing circuit, and
second digital delay means interposed between the output of said second digital filter and an input terminal of said D/A converter.

4. A PCM coder and decoder according to claim 3, further comprising:
an expandor which converts a $\mu$-law compessed input PCM signal into a linear PCM signal which is applied to the input terminal of said first digital filter, and
a compressor which converts an output linear PCM signal of said fourth digital filter into a $\mu$-law compressed PCM signal.

5. A PCM coder and decoder comprising:
a first circuit for decoding a first PCM signal into a first analogue signal, including a first digital filter which converts the first PCM signal into a PCM signal having a sampling frequency higher than that of said first PCM signal, a second digital filter which converts an output of said first digital filter into a PCM signal having a sampling frequency higher than that of the output of said first digital filter, a D/A converter which converts an output of said second digital filter into a first analogue signal, and a post-filter for filtering an output of said D/A converter;
an analogue balancing circuit having amplifier means for amplifying an output of said post-filter, and first subtracting means for subtracting an output of said amplifier means from a second analogue signal;
a digital balancing circuit having digital circuit means for filtering an output of said first digital filter; and
a second circuit comprising an analogue pre-filter inputting an output of said analogue balancing circuit, an A/D converter for converting the output signal of said pre-filter into a PCM signal, a third digital filter which changes an output of said A/D converter into a digital signal having a sampling frequency lower than that of the output of said A/D converter, an operating unit for subtracting an output signal of said digital balancing circuit from an output of said third digital filter, and a fourth digital filter which changes an output of said operating unit into a digital signal having a sampling frequency lower than that of said A/D converter.

* * * * *